US012046127B2

(12) United States Patent
Chen et al.

(10) Patent No.: US 12,046,127 B2
(45) Date of Patent: Jul. 23, 2024

(54) VIDEO DOORBELL AND AUTOMATIC SETTING METHOD THEREOF

(71) Applicant: Sercomm Corporation, Taipei (TW)

(72) Inventors: Chien-Ming Chen, Taipei (TW); Po-Tsung Chen, Taipei (TW)

(73) Assignee: SERCOMM CORPORATION, Taipei (TW)

( * ) Notice: Subject to any disclaimer, the term of this patent is extended or adjusted under 35 U.S.C. 154(b) by 318 days.

(21) Appl. No.: 17/829,426

(22) Filed: Jun. 1, 2022

(65) Prior Publication Data

US 2023/0084895 A1 Mar. 16, 2023

(30) Foreign Application Priority Data

Sep. 16, 2021 (CN) ......................... 202111089703.2

(51) Int. Cl.
*G08B 3/10* (2006.01)

(52) U.S. Cl.
CPC ...................................... *G08B 3/10* (2013.01)

(58) Field of Classification Search
CPC .................................... G08B 3/10; G08B 7/06
See application file for complete search history.

(56) References Cited

U.S. PATENT DOCUMENTS

| | | | | |
|---|---|---|---|---|
| 9,633,530 | B2 | 4/2017 | Chen et al. | |
| 10,325,453 | B2 | 6/2019 | Chen et al. | |
| 10,805,536 | B2 | 10/2020 | Chen et al. | |
| 2018/0322743 | A1* | 11/2018 | Chen ......................... | H02J 7/02 |
| 2022/0021767 | A1* | 1/2022 | Kasmir .................... | G08B 3/10 |

FOREIGN PATENT DOCUMENTS

| | | | |
|---|---|---|---|
| CN | 204480411 | U | 7/2015 |
| CN | 205354222 | U | 6/2016 |
| CN | 205354223 | U | 6/2016 |
| CN | 106934962 | A | 7/2017 |
| CN | 108833858 | A | 11/2018 |

* cited by examiner

*Primary Examiner* — Toan N Pham
*Assistant Examiner* — Rajsheed O Black-Childress
(74) *Attorney, Agent, or Firm* — McClure, Qualey & Rodack, LLP

(57) ABSTRACT

A video doorbell and an automatic setting method thereof are provided. The video doorbell includes a bridge rectifying unit, a switch unit, and a processing unit. The bridge rectifying unit is configured to output a DC voltage when receiving an AC power from a transformer. During a chime type detection mode, the switch unit is configured to switch a path of the AC power for generating a short-circuit current to trigger a chime. After the short-circuit current is kept for a detection time, the short-circuit current is terminated. During the chime type detection mode, when the short-circuit current is terminated, the processing unit detects a rising time of the DC voltage rising from a first level to a second level, and determine whether the chime is an analog chime or a digital chime according to the rising time.

17 Claims, 9 Drawing Sheets

VIDEO DOORBELL AND AUTOMATIC SETTING METHOD THEREOF

This application claims the benefit of People's Republic of China application Serial No. 202111089703.2, filed Sep. 16, 2021, the disclosure of which is incorporated by reference herein in its entirety.

TECHNICAL FIELD

The disclosure relates in general to an electric device and an automatic setting method thereof, and more particularly to a video doorbell and an automatic setting method thereof.

BACKGROUND

In most homes, there will be a doorbell, and the visitor can press a button to trigger a chime to make a sound. The chime may be a digital chime or an analog chime. In the digital chime, a memory, a control circuit and a speaker are used to play a piece of music. In order to play whole of the music, a ringing time of the digital chime takes about 5 seconds to 30 seconds. In the analog chime, an electromagnet is used to drive an iron block to bounce against a metal wall to make the sound "ding", and when the magnetism is released, the iron block falls back to a base to make the sound "dong". The interval between the sound "ding" and the sound "dong" should not be too long, so the ringing time of the analog chime is about 0.5 seconds to 2 seconds.

With the advancement of science and technology, a video doorbell having a video camera has been invented. The video doorbell can be installed with the original chime. However, the original chime may be a digital chime or an analog chime, so additional manual settings are required for the video doorbell, but such a setting procedure is not easy for the users, making it difficult to widely promote the video doorbell.

SUMMARY

The disclosure is directed to a video doorbell and an automatic setting method thereof. Using the voltage analysis, the video doorbell can detect the type of chime by itself, and then automatically set the ringing time, so that the users can directly install the video doorbell without complex setting procedures. In this way, the video doorbell can be widely promoted.

According to one embodiment, a video doorbell is provided. The video doorbell includes a bridge rectifying unit, a switch unit, and a processing unit. The bridge rectifying unit is configured to output a DC voltage when receiving an AC power from a transformer. The switch unit is connected to the bridge rectifying unit and the transformer. During a chime type detection mode, the switch unit is configured to switch a path of the AC power for generating a short-circuit current to trigger a chime. After the short-circuit current is kept for a detection time, the short-circuit current is terminated. The processing unit is connected to the bridge rectifying unit. During the chime type detection mode, when the short-circuit current is terminated, the processing unit detects a rising time of the DC voltage rising from a first level to a second level, and determine whether the chime is an analog chime or a digital chime according to the rising time.

According to another embodiment, an automatic setting method of a video doorbell is provided. The video doorbell includes a bridge rectifying unit, a switch unit and a processing unit. The switch unit is connected to the bridge rectifying unit and a transformer. The processing unit is connected to the bridge rectifying unit. The automatic setting method includes the following steps. The video doorbell is controlled to enter a chime type detection mode. During a chime type detection mode, the switch unit switches a path of the AC power for generating a short-circuit current to trigger a chime, and the short-circuit current is terminated after the short-circuit current is kept for a detection time. During the chime type detection mode, the processing unit detects a rising time of the DC voltage rising from a first level to a second level when the short-circuit current is terminated. The processing unit determines whether the chime is an analog chime or a digital chime according to the rising time.

Figure 1A:
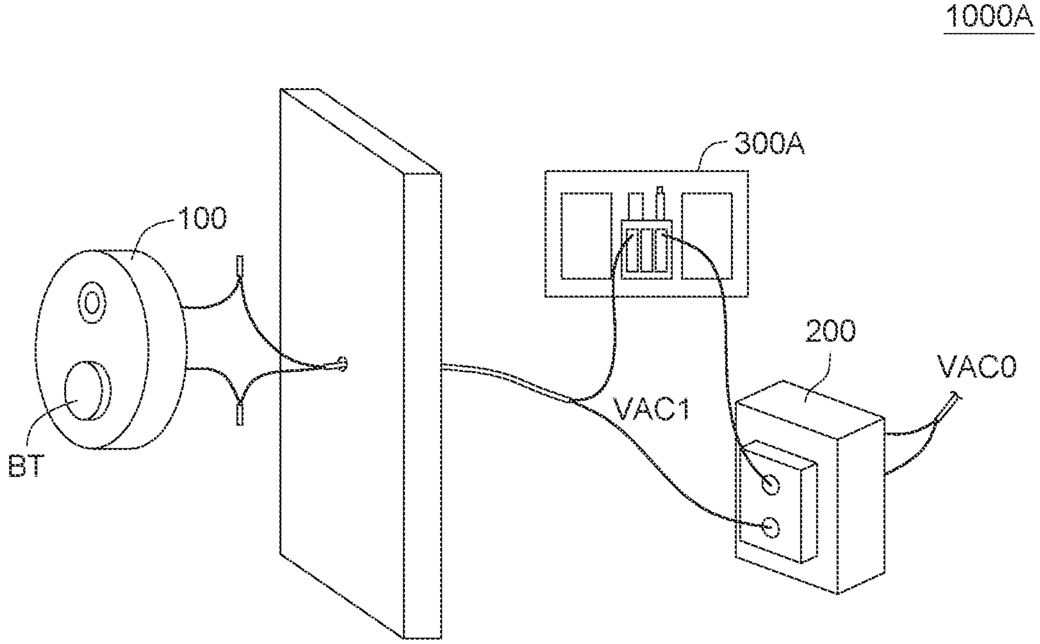
FIG. 1A shows a schematic diagram of a video doorbell system according to an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Please refer to FIG. 1A, which shows a schematic diagram of a video doorbell system 1000A according to an embodiment. The video doorbell system 1000A includes a video doorbell 100, a transformer 200 and a chime 300A. The video doorbell 100 has a video function and a communication function. The video doorbell 100 is, for example, an electronic device composed of a button, a camera, a microphone, a speaker, and a communication circuit. The transformer 200 is used to convert an AC power VAC0 (for example, 110V to 240V) to an AC power VAC1 (for example, 8V to 24V). The chime 300A may be built into the home in advance. The chime 300A is, for example, an analog chime. When the AC power VAC1 is supplied to the video doorbell 100, the video doorbell 100 waits for a visitor to press the button BT. After the button BT is pressed, the AC power VAC1 will trigger the chime 300A. The chime 300A (analog chime) uses an electromagnet to drive an iron block to produce the sounds of "ding" and "dong." The ringing time is about 0.5 seconds to 2 seconds.

Figure 1B:
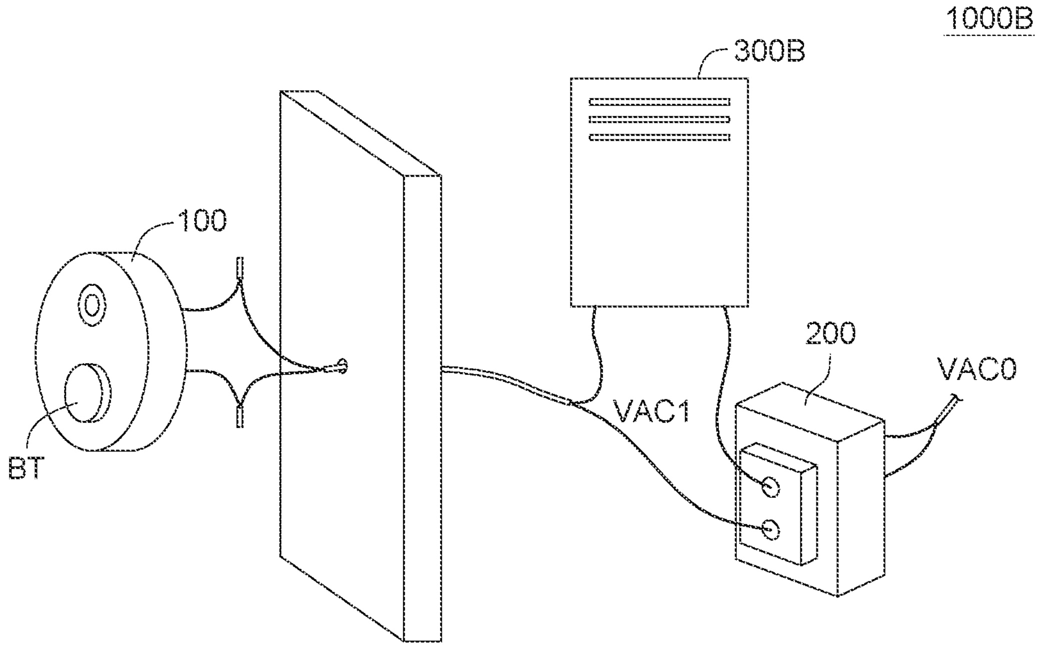
FIG. 1B shows a schematic diagram of a video doorbell system according to another embodiment.

Please refer to FIG. 1B, which shows a schematic diagram of a video doorbell system 1000B according to another embodiment. The video doorbell system 1000B includes the video doorbell 100, the transformer 200 and a chime 300B. The chime 300B is, for example, a digital chime. When the AC power VAC1 is supplied to the video doorbell 100, the video doorbell 100 waits for the visitor to press the button BT. After the button BT is pressed, the AC power VAC1 will trigger the chime 300B. The chime 300B (digital chime) will use a memory, a control circuit and a speaker to play a piece of music. The ringing time is about 5 seconds to 30 seconds.

Because the video doorbell 100 may be installed with the chime 300A (analog chime) or the chime 300B (digital chime), additional manual settings are required when installing the video doorbell 100, so that the video doorbell 100 can trigger the chime 300A or 300B with a suitable ringing time. In the present embodiment, the video doorbell 100 can detect the type of the connected chime (300A or 300B) by itself, and then automatically set the ringing time, so that the users can directly install the video doorbell 100 without complex setting procedures.

Figure 2:
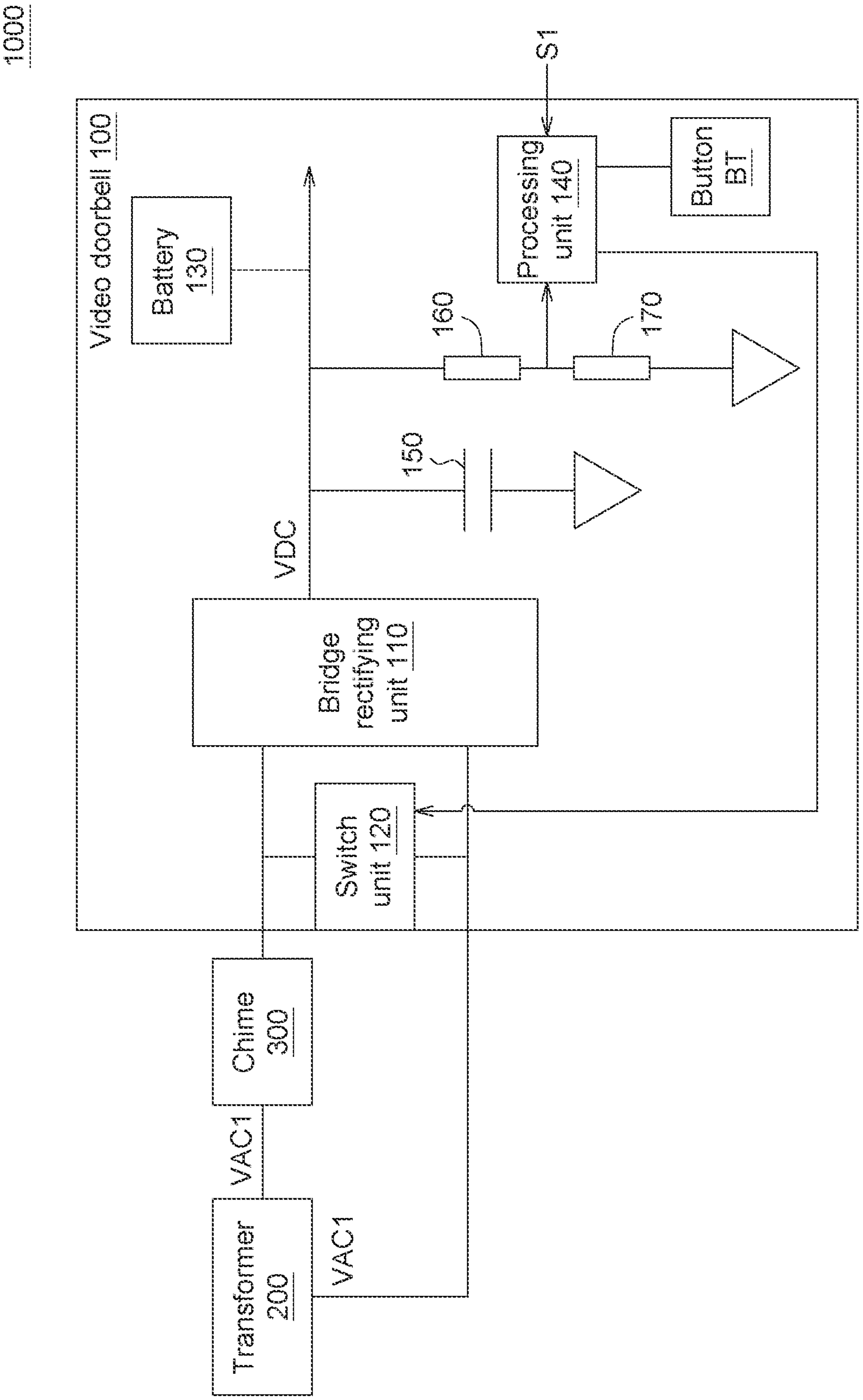
FIG. 2 shows a block diagram of a video doorbell system according to an embodiment.

Please refer to FIG. 2, which shows a block diagram of a video doorbell system 1000 according to an embodiment. The video doorbell system 1000 includes the video doorbell 100, the transformer 200 and a chime 300. The chime 300 may be the analog chime, or the digital chime.

The video doorbell 100 at least includes a bridge rectifying unit (bridge diode) 110, a switch unit 120, a battery 130, a processing unit 140, a capacitor 150, a first resistor 160, a second resistor 170 and a button BT. The bridge rectifying unit 110 receives the AC power VAC1 provided by the transformer 200 and then outputs the DC voltage VDC. The bridge rectifying unit 110 may include diodes.

The switch unit 120 is connected to the bridge rectifying unit 110 and the transformer 200. The switch unit 120 is used to switch the path of the AC power VAC1. For example, when the switch unit 120 provides an open circuit path, the AC power VAC1 is provided to the bridge rectifying unit 110; when the switch unit 120 provides a short-circuit path, the AC power VAC1 will generate a short-circuit current, which triggers the chime 300. The switch unit 120 is, for example, a Triac or a MOS relay.

The battery 130 is used to provide system electricity when the AC power VAC1 triggers the chime 300. The battery 130 is, for example, a lithium battery or a carbon-zinc battery. The processing unit 140 is connected to the bridge rectifying unit 110. The processing unit 140 is used to control the operation of the video doorbell 100, including the automatic detection of the type of chime 300 and the automatic setting of the ringing time during installation. The capacitor 150 is connected to an output terminal of the bridge rectifying unit 110. The first resistor 160 is connected to an output terminal of the bridge rectifying unit 110. The second resistor 170 is connected to the first resistor 160. An input terminal of the processing unit 140 is connected to a node between the first resistor 160 and the second resistor 170. The button BT is connected to the processing unit 140. The button BT is, for example, a push button, a touch button or an infrared sensor button, etc.

Figure 3:
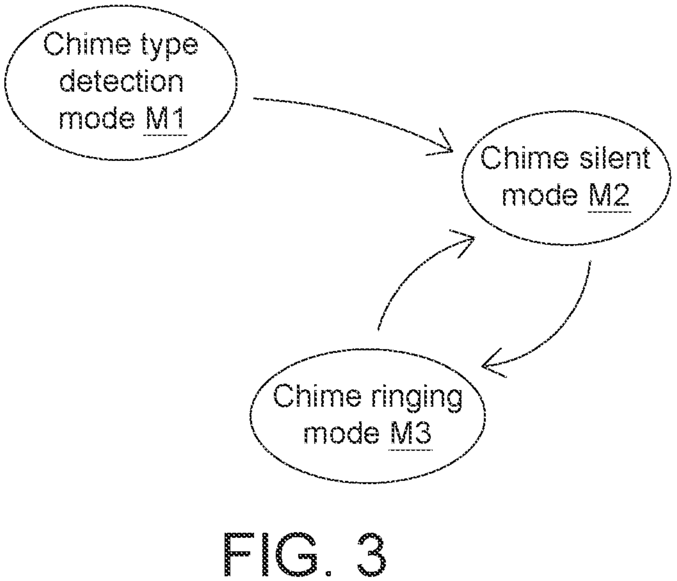
FIG. 3 shows a state machine diagram of the video doorbell according to an embodiment.

Please refer to FIG. 3, which shows a state machine diagram of the video doorbell 100 according to an embodiment. The video doorbell 100 has a chime type detection mode M1, a chime silent mode M2 and a chime ringing mode M3. During the chime type detection mode M1, the video doorbell 100 can automatically detect the type of the chime 300, and automatically make relevant settings. Once the relevant settings are completed, the video doorbell 100 enters the chime silent mode M2.

During the chime silent mode M2, the video doorbell 100 receives the AC power VAC1 (shown in the FIG. 2), and will enter the chime ringing mode M3 when the button BT (shown in the FIG. 2) is pressed. During the chime ringing mode M3, the AC power VAC1 (shown in FIG. 2) will trigger the chime 300 to ring. After the chime 300 rings for the ringing time, the video doorbell 100 will return to the chime silent mode M2. During normal use, the video doorbell 100 alternates between the chime silent mode M2 and the chime ringing mode M3.

Figure 4A:
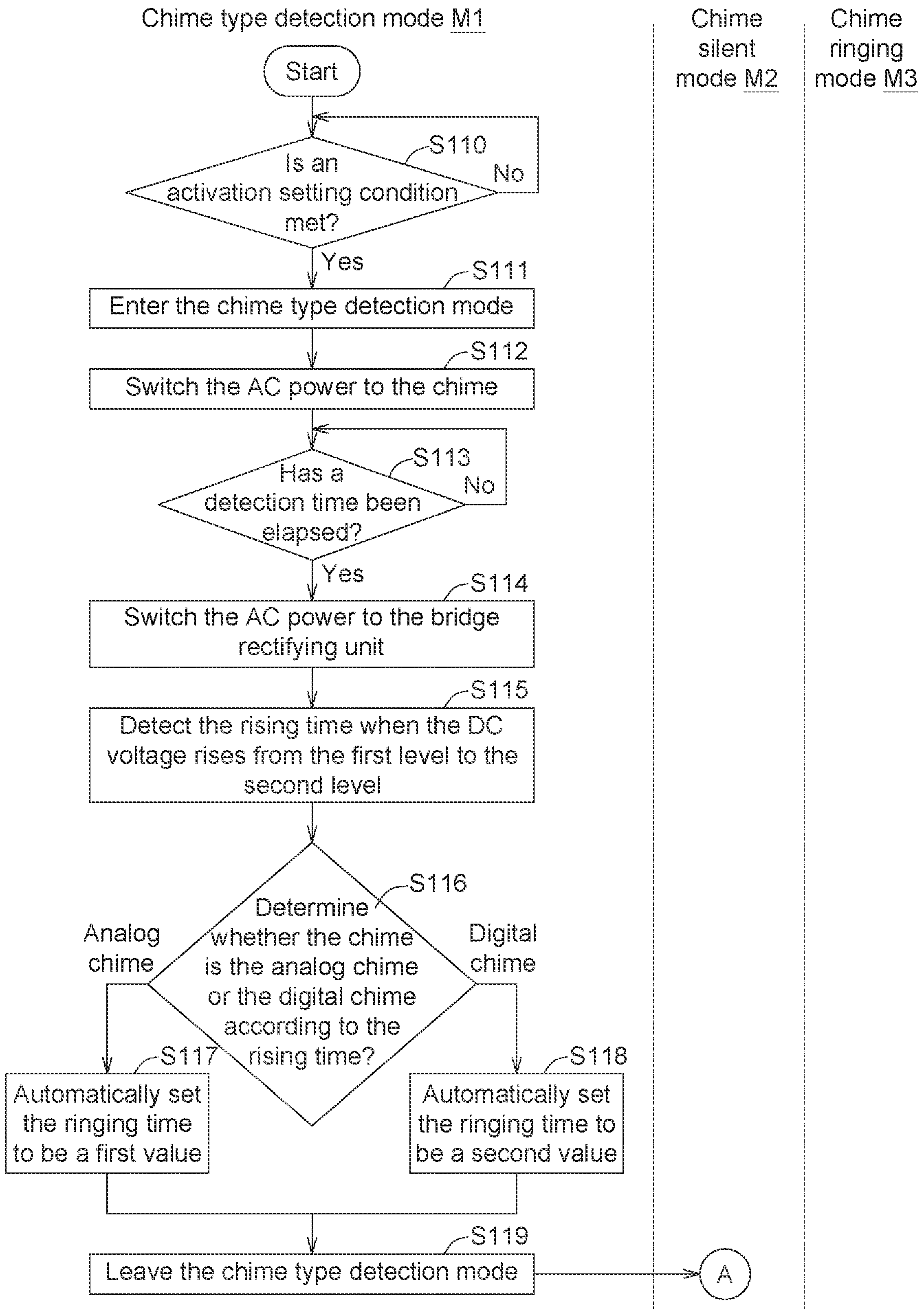
FIGS. 4A to 4B illustrate a flowchart of an operation method of the video doorbell according to an embodiment.
Figure 4B:
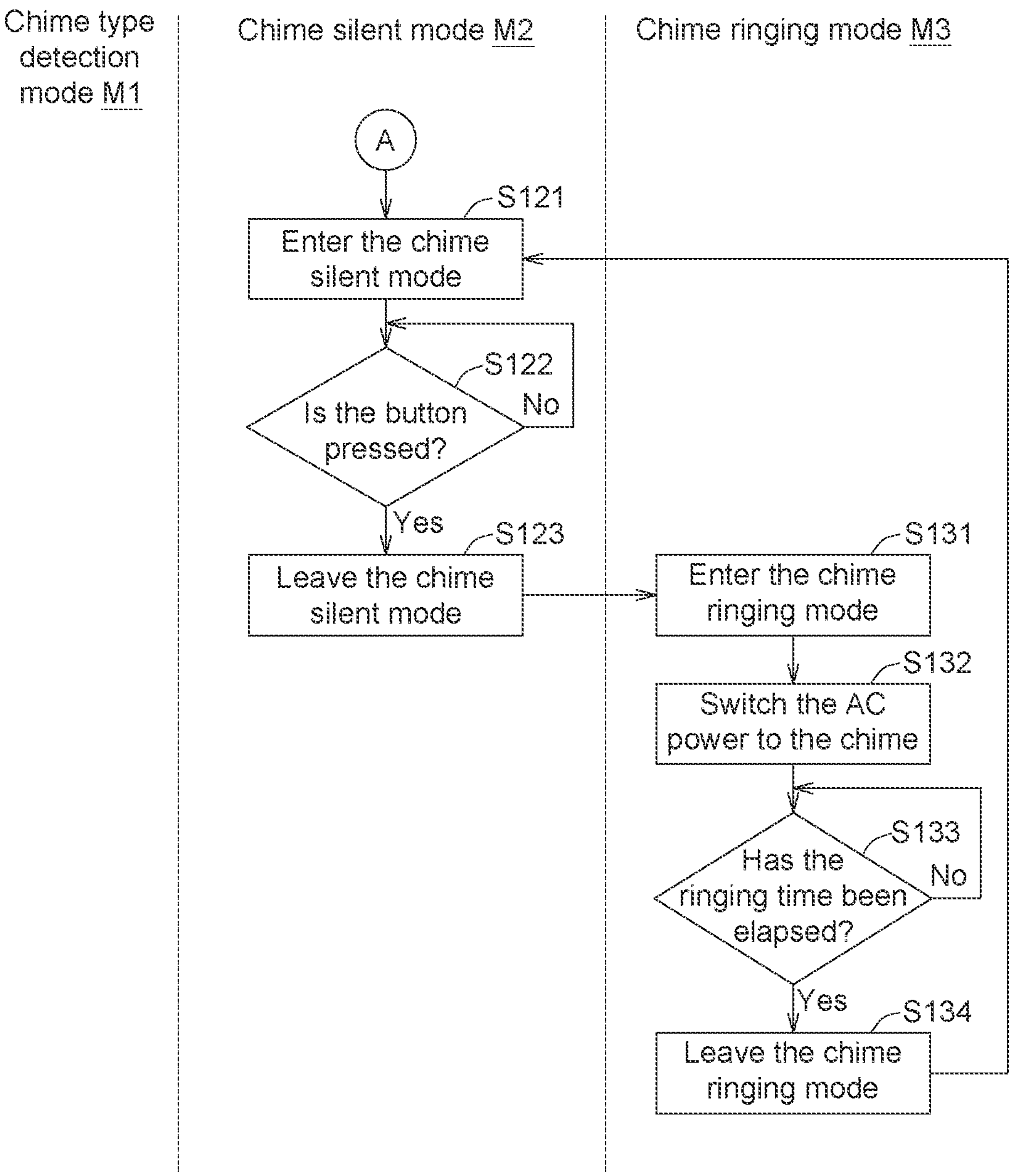

Please refer to FIGS. 4A to 4B, which illustrate a flowchart of an operation method of the video doorbell 100 according to an embodiment. The steps S110 to S119 are executed during the chime type detection mode M1, which is an automatic setting method during installation; the steps S121 to S123 are executed during the chime silent mode M2, and the steps S131 to S134 are executed during the chime ringing mode M3.

Figure 5A:
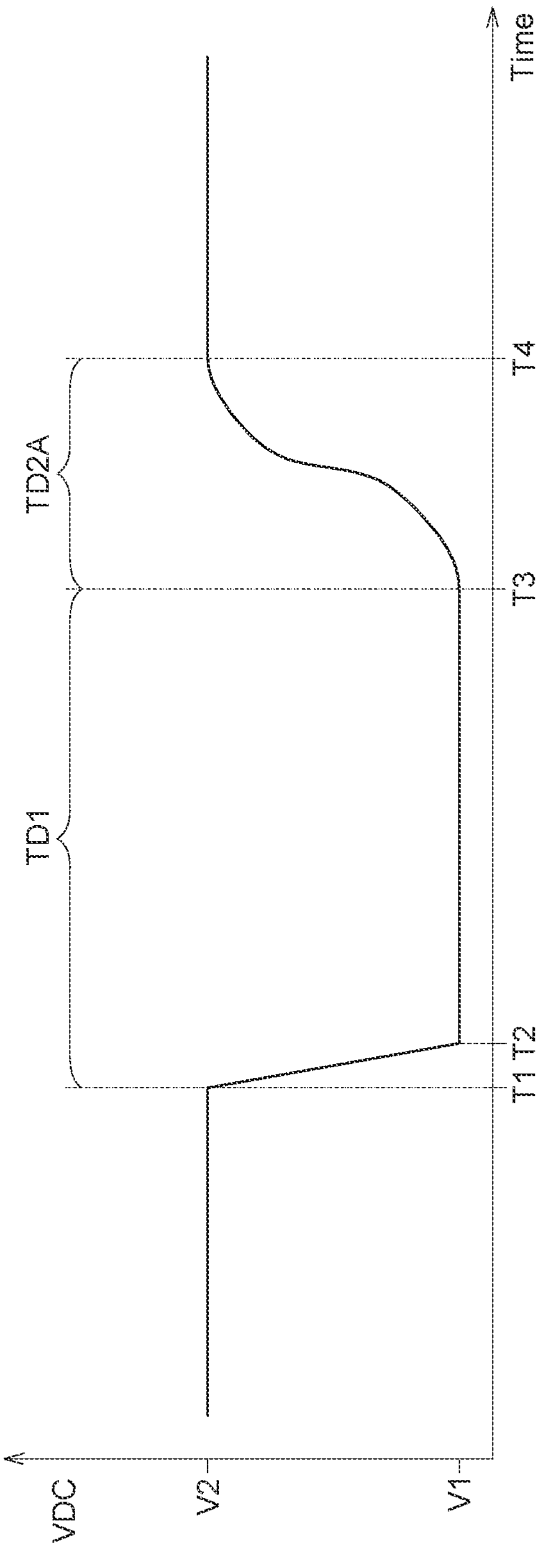
FIG. 5A illustrates the change of the DC voltage in case of that the chime is the analog chime.
Figure 5B:
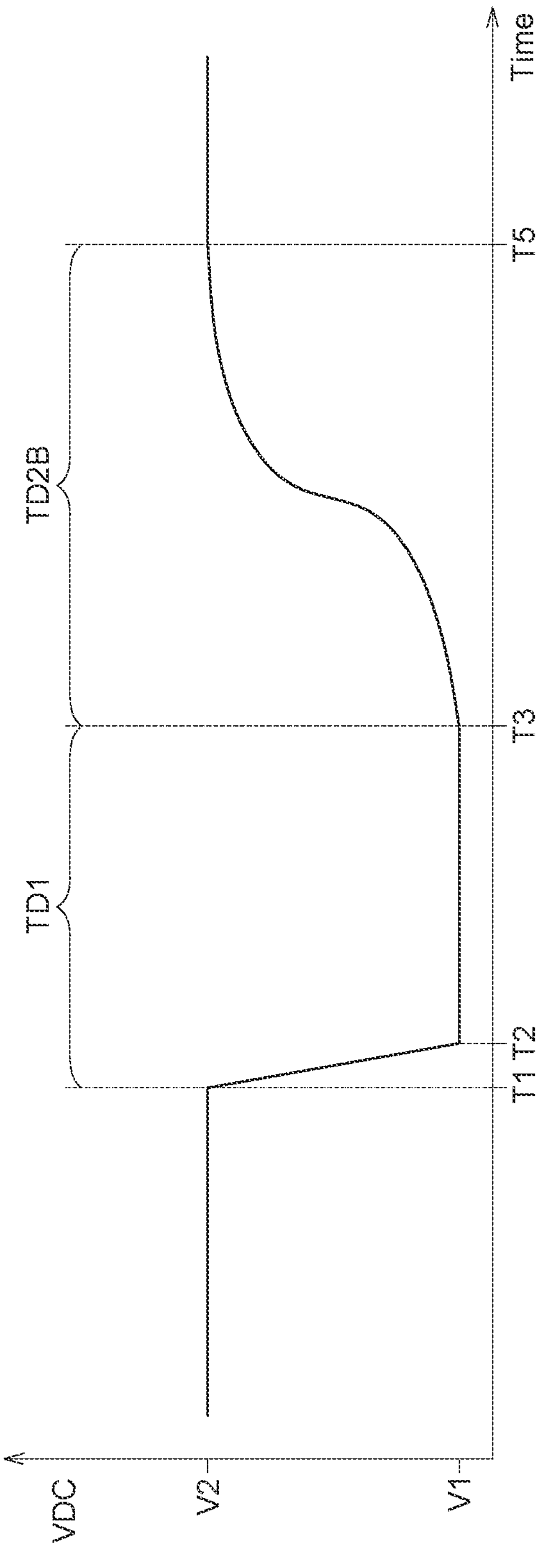
FIG. 5B illustrates the change of the DC voltage VDC in case of that the chime is the digital chime.

During the chime type detection mode M1, the path of the AC power VAC1 is switched and the change in voltage is used to determine whether the chime 300 is the analog chime or the digital chime. Please refer to FIGS. 5A to 5B. FIG. 5A illustrates the change of the DC voltage VDC in case of that the chime 300 is the analog chime; FIG. 5B illustrates the change of the DC voltage VDC in case of that the chime 300 is the digital chime. The steps S110 to S119 will be illustrated with FIGS. 5A to 5B.

In the step S110, the processing unit 140 determines whether an activation setting condition is met. The activation setting condition is, for example, that the button BT is pressed for a predetermined pressing time (for example, 5 to 10 seconds), or the processing unit 140 receives a remote control signal S1, e.g. from a portable device or a computer. If the activation setting condition is met, the process proceeds to the step S111. In the step S111, the processing unit 140 controls the video doorbell 100 to enter the chime type detection mode M1.

Figure 6:
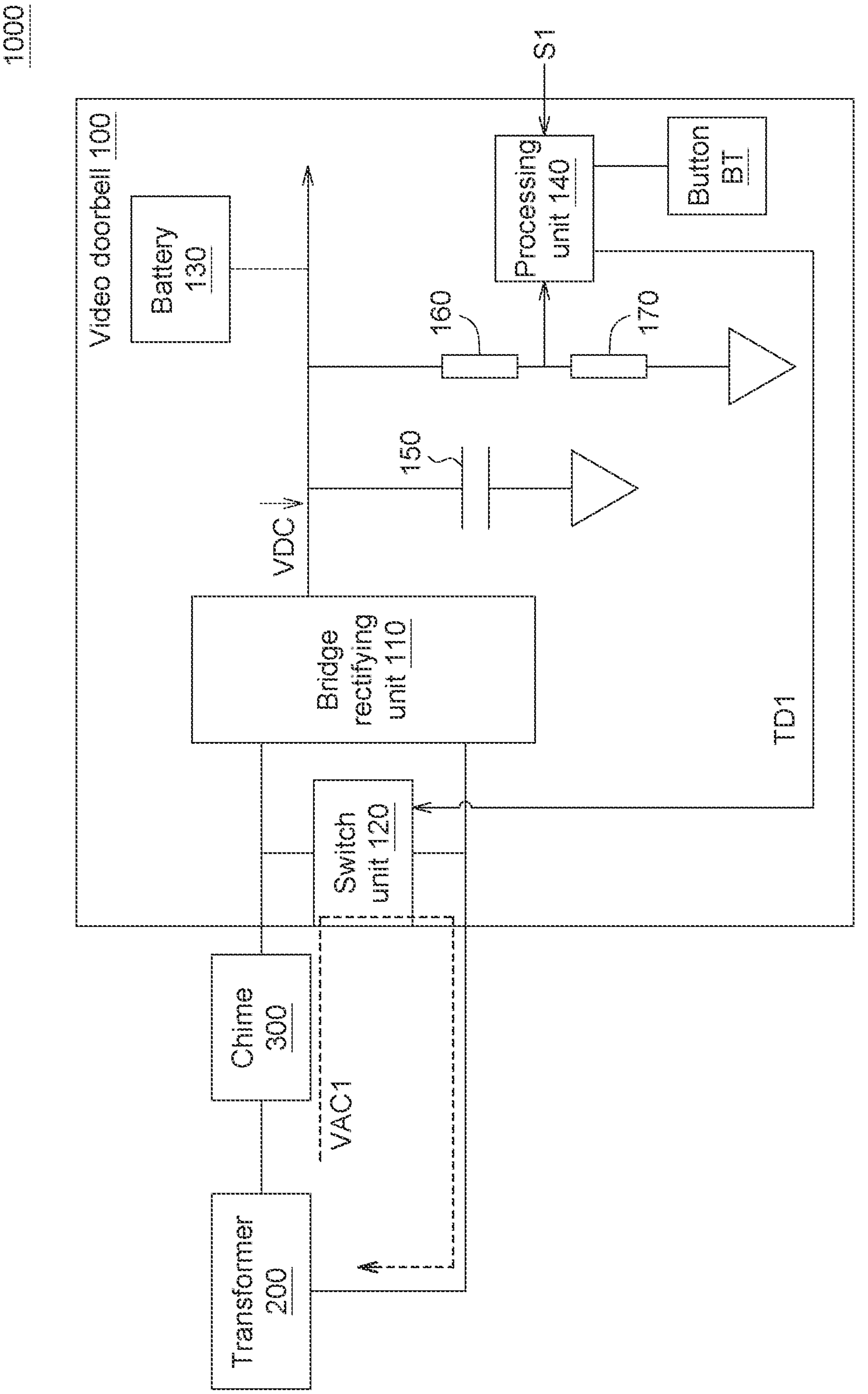
FIG. 6 illustrates the step S112.

Then, please refer to FIG. 6, which illustrates the step S112. In the step S112, the switch unit 120 makes the AC power VAC1 of the transformer 200 generate a short-circuit current, thereby triggering the chime 300. For example, as shown in FIG. 6, the switch unit 120 provides a short-circuit path for the AC power VAC1 to trigger the chime 300. As shown at time point T1 in FIGS. 5A and 5B, the chime 300 is triggered.

As shown in FIG. 6, the AC power VAC1 triggers the chime 300, so the DC voltage VDC outputted by the bridge rectifying unit 110 will drop rapidly. As shown in the time points T1 to T2 in FIG. 5A and FIG. 5B, the DC voltage VDC will drop rapidly from the second level V2 to the first level V1. Then, in step S113, the processing unit 140 determines whether a detection time TD1 has been elapsed. The detection time TD1 is, for example, 3 to 6 seconds. That is to say, the action of the switch unit 120 providing the short-circuit path will be maintained for 3 to 6 seconds to ensure that the DC voltage VDC has dropped to the first level V1. If the detection time TD1 has been elapsed, the process proceeds to the step S114.

Figure 7:
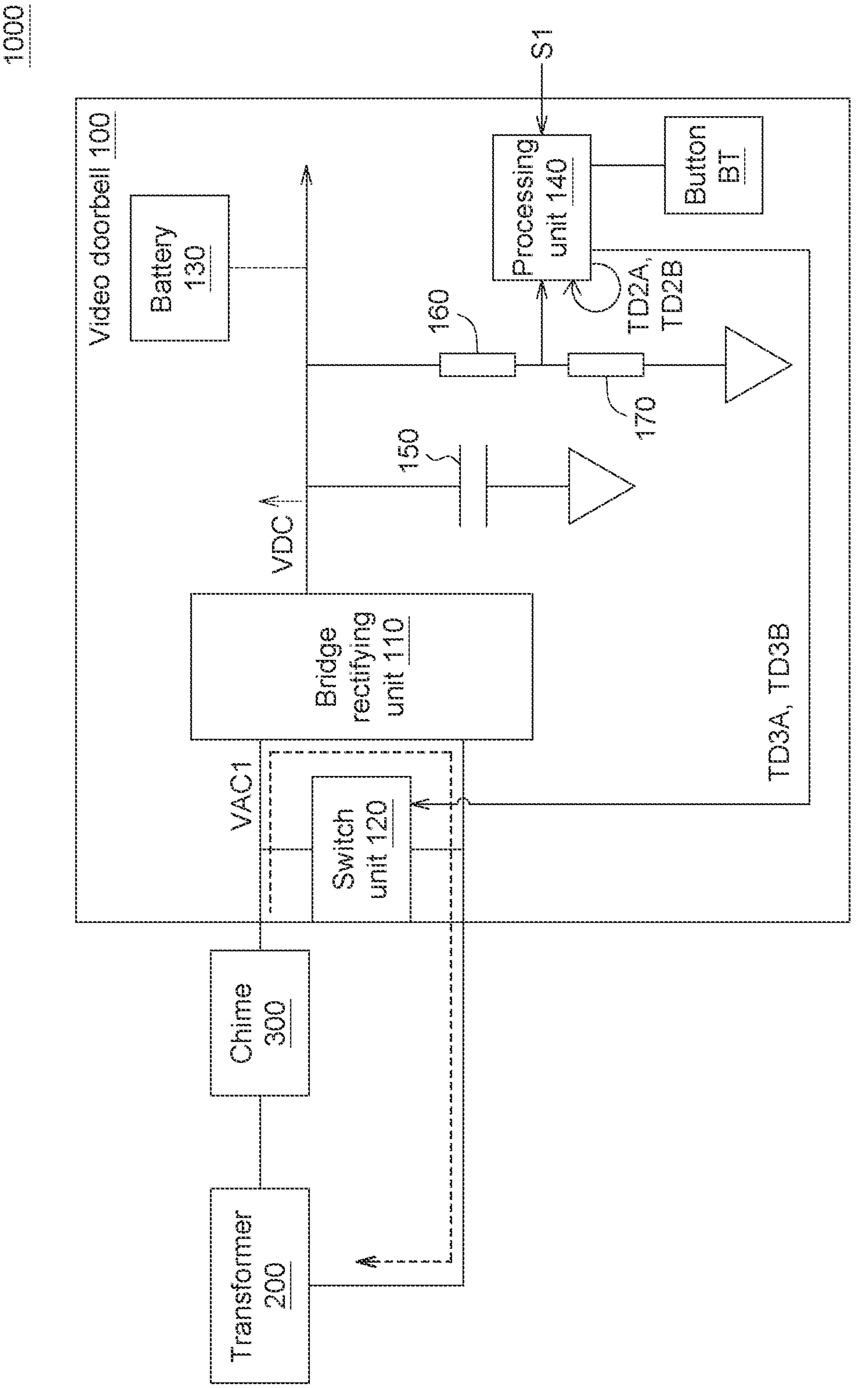
FIG. 7 illustrates the step S114.

Then, please refer to FIG. 7, which illustrates the step S114. In step S114, the switch unit 120 is switched to terminate generating the short-circuit current. As shown in FIG. 5A, the DC voltage VDC rises from the first level V1 at the time point T3 until it reaches the second level V2 at the time point T4. As shown in FIG. 5B, the DC voltage VDC rises from the first level V1 at the time point T3, until it reaches the second level V2 at the time point T5.

Then, in step S115, the processing unit 140 detects the rising time TD2A, TD2B when the DC voltage VDC rises from the first level V1 to the second level V2. In step S115, the processing unit 140 detects the DC voltage VDC every default time period. The default time period is 70 millisecond. For example, the default time period is 50 milliseconds (ms), 60 milliseconds or 70 milliseconds.

Next, in the step S116, the processing unit 140 determines whether the chime 300 is the analog chime or the digital chime according to the rising time TD2A, TD2B. As shown in FIG. 5A, in case of that the chime 300 is the analog chime, the rising time TD2A of the DC voltage VDC rising from the first level V1 to the second level V2 is shorter; as shown in FIG. 5B, in case of the chime 300 is the digital chime, the rising time TD2B of the DC voltage VDC rising from the first level V1 to the second level V2 is longer. If the rising time TD2A is less than or equal to a predetermined value (for example, 50 milliseconds), the processing unit 140 deems that the chime 300 is the analog chime; if the rising time TD2B is greater than the predetermined value, the processing unit 140 deems that the chime 300 is the digital chime. If it is determined that the chime 300 is the analog chime, then the process proceeds to the step S117; if it is determined that the chime 300 is the digital chime, the process proceeds to the step S118.

In the step S117, the processing unit 140 automatically sets the ringing time TD3A to be a first value, for example 0.5 seconds to 2 seconds. The short ringing time TD3A can make the interval between "ding" and "dong" not too long. In the step S118, the processing unit 140 automatically sets the ringing time TD3B to be a second value, for example 5 seconds to 30 seconds. The long ringing time TD3B can be used for playing a whole piece of music. The ringing time TD3A and TD3B set in the above steps S117 and S118 is used for the chime ringing mode M3 and different from the detection time TD1 used for the chime type detection mode M1. In the chime type detection mode M1, the type of the chime 300 is unknown. Regardless of the type of the chime 300, the same detection time TD1 is used. In this way, during the chime type detection mode M1, the video doorbell 100 can automatically detect the type of the chime 300, and automatically make relevant settings.

Then, in the step S119, the processing unit 140 controls the video doorbell 100 to leave the chime type detection mode M1. Next, in the step S121, the processing unit 140 controls the video doorbell 100 to enter the chime silent mode M2. Next, in the step S122, the processing unit 140 determines whether the button BT is pressed. If the button BT is pressed, the process proceeds to the step S123. In the step S123, the processing unit 140 controls the video doorbell 100 to leave the chime silent mode M2. Next, in the step S131, the processing unit 140 controls the video doorbell 100 to enter the chime ringing mode M3. Then, in the step S132, the switch unit 120 forms a short-circuit path of the AC voltage VAC1 of the transformer 200 for generating a short-circuit current to trigger the chime 300, so that the chime 300 makes a sound. Next, in the step S133, the processing unit 140 determines whether the ringing time TD3A (or the ringing time TD3B) has been elapsed. If the ringing time TD3A (or the ringing time TD3B) has been elapsed, the process proceeds to the step S134. In the step S134, the processing unit 140 control the video doorbell 100 to leave the chime ringing mode M3. Next, the process returns to the step S121. The process after that will alternate between the chime silent mode M2 and the chime ringing mode M3.

According to the above embodiment, the video doorbell 100 can detect the type of the chime 300 by itself, and then automatically set the ringing time, so that the user can directly install the video doorbell 100 without the need of complex setting procedures. In this way, the video doorbell 100 can be widely promoted.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A video doorbell, comprising:

a bridge rectifying unit, configured to output a DC voltage when receiving an AC power from a transformer;

a switch unit, connected to the bridge rectifying unit and the transformer, wherein during a chime type detection mode, the switch unit is configured to switch a path of the AC power for generating a short-circuit current to trigger a chime, and after the short-circuit current is kept for a detection time, the short-circuit current is terminated; and a processing unit, connected to the bridge rectifying unit, wherein during the chime type detection mode, when the short-circuit current is terminated, the processing unit detects a rising time of the DC voltage rising from a first level to a second level, and determine whether the chime is an analog chime or a digital chime according to the rising time.

2. The video doorbell according to claim 1, wherein the detection time is 3 to 6 seconds.

3. The video doorbell according to claim 1, wherein if the rising time is less than or equal to a predetermined value, the processing unit deems that the chime is the analog chime;

if the rising time is larger than the predetermined value, the processing unit deems that the chime is the digital chime.

4. The video doorbell according to claim 3, wherein the predetermined value is 50 milliseconds.

5. The video doorbell according to claim 1, wherein during a chime ringing mode, the switch unit switches the path of the AC power for generating the short-circuit current to trigger the chime; after the short-circuit current is kept for a ringing time, the short-circuit current is terminated; and the detection time is different from the ringing time;

if the chime is the analog chime, the processing unit sets the ringing time to be a first value;

if the chime is the digital chime, the processing unit sets the ringing time to be a second value, wherein the first value is lower than the second value.

6. The video doorbell according to claim 5, wherein the first value is 0.5 seconds to 2 seconds; the second value is 5 seconds to 30 seconds.

7. The video doorbell according to claim 5, further comprising:

a capacitor, connected to an output terminal of the bridge rectifying unit;

a first resistor, connected to the output terminal of the bridge rectifying unit; and a second resistor, connected to the first resistor, wherein an input terminal of the processing unit is connected to a node between the first resistor and the second resistor.

8. The video doorbell according to claim 1, wherein during the chime type detection mode, the processing unit detects the DC voltage every default time period;

when the processing unit detects that a button is pressed for a predetermined pressing time, or when the processing unit receives a remote control signal, the processing unit controls the video doorbell to enter the chime type detection mode, and the remote control signal is transmitted from a portable device or a computer.

9. The video doorbell according to claim 8, wherein the default time period is 50 milliseconds (ms) to 70 milliseconds.

10. An automatic setting method of a video doorbell, wherein the video doorbell includes a bridge rectifying unit, a switch unit and a processing unit, the switch unit is connected to the bridge rectifying unit and a transformer, the processing unit is connected to the bridge rectifying unit, and the automatic setting method includes:

controlling the video doorbell to enter a chime type detection mode;

during the chime type detection mode, switching, by the switch unit, a path of an AC power for generating a short-circuit current to trigger a chime, and terminating the short-circuit current after the short-circuit current is kept for a detection time;

during the chime type detection mode, detecting, by the processing unit, a rising time of the DC voltage rising from a first level to a second level when the short-circuit current is terminated; and determining, by the processing unit, whether the chime is an analog chime or a digital chime according to the rising time.

11. The automatic setting method of the video doorbell according to claim 10, wherein the detection time is 3 to 6 seconds.

12. The automatic setting method of the video doorbell according to claim 10, wherein deeming, by the processing unit, that the chime is the analog chime, if the rising time is less than or equal to a predetermined value;

deeming, by the processing unit, that the chime is the digital chime, if the rising time is larger than the predetermined value.

13. The automatic setting method of the video doorbell according to claim 12, wherein the predetermined value is 50 milliseconds.

14. The automatic setting method of the video doorbell according to claim 10, wherein during a chime ringing mode, the switch unit switches the path of the AC power for generating the short-circuit current to trigger the chime; after the short-circuit current is kept for a ringing time, the short-circuit current is terminated; and the detection time is different from the ringing time;

the automatic setting method further comprises:

setting, by the processing unit, the ringing time to be a first value, if the chime is the analog chime; and setting, by the processing unit, the ringing time to be a second value, if the chime is the digital chime, wherein the first value is lower than the second value.

15. The automatic setting method of the video doorbell according to claim 14, wherein the first value is 0.5 seconds to 2 seconds; the second value is 5 seconds to 30 seconds.

16. The automatic setting method of the video doorbell according to claim 10, wherein during the chime type detection mode, the processing unit detects the DC voltage every default time period;

when the processing unit detects that a button is pressed for a predetermined pressing time, the processing unit controls the video doorbell to enter the chime type detection mode.

17. The automatic setting method of the video doorbell according to claim 16, wherein the default time period is 50 milliseconds to 70 milliseconds.

* * * * *